United States Patent
Lee et al.

(10) Patent No.: US 11,227,596 B2
(45) Date of Patent: Jan. 18, 2022

(54) LAUNDRY SCHEDULING DEVICE

(71) Applicant: LG ELECTRONICS INC., Seoul (KR)

(72) Inventors: Taeho Lee, Seoul (KR); Jaehong Kim, Seoul (KR); Hyoeun Kim, Seoul (KR); Hangil Jeong, Seoul (KR); Jongwoo Han, Seoul (KR); Doyoung Lee, Seoul (KR); Hyejeong Jeon, Seoul (KR); Dami Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 16/600,294

(22) Filed: Oct. 11, 2019

(65) Prior Publication Data

US 2020/0193988 A1     Jun. 18, 2020

Related U.S. Application Data

(63) Continuation of application No. PCT/KR2018/015955, filed on Dec. 14, 2018.

(51) Int. Cl.
| | |
|---|---|
| *G10L 15/00* | (2013.01) |
| *G10L 15/22* | (2006.01) |
| *D06F 33/00* | (2020.01) |
| *G05B 13/02* | (2006.01) |

(Continued)

(52) U.S. Cl.
CPC .............. *G10L 15/22* (2013.01); *D06F 33/00* (2013.01); *G05B 13/027* (2013.01); *G10L 15/02* (2013.01); *G10L 15/08* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 2006/0225302 | A1 | 10/2006 | Lyu et al. |
| 2010/0236296 | A1 | 9/2010 | Choi et al. |
| 2013/0086520 | A1 | 4/2013 | Beaudet et al. |

(Continued)

FOREIGN PATENT DOCUMENTS

| | | |
|---|---|---|
| CN | 108130683 | 6/2018 |
| CN | 108914489 | 11/2018 |

(Continued)

OTHER PUBLICATIONS

PCT International Application No. PCT/KR2018/015955, Written Opinion of the International Searching Authority dated Sep. 6, 2019, 8 pages.

(Continued)

*Primary Examiner* — Vu B Hang
(74) *Attorney, Agent, or Firm* — Lee, Hong, Degerman, Kang & Waimey PC

(57) ABSTRACT

A laundry scheduling device according to an embodiment of the present invention includes an input interface that receives speech including a plurality of words respectively representing a plurality of laundry items from a use, and a processor that acquires one or more features represented by each of the plurality of words by inputting speech data corresponding to the received speech to a learning model and performing word embedding, and generates a laundry schedule of the plurality of laundry items based on the one or more features represented by each of the plurality of words.

19 Claims, 9 Drawing Sheets

(51) Int. Cl.
    *G10L 15/02*    (2006.01)
    *G10L 15/08*    (2006.01)

(56) References Cited

U.S. PATENT DOCUMENTS

2018/0044834 A1    2/2018    Shu et al.
2018/0305851 A1    10/2018   Kwon et al.
2019/0198020 A1    6/2019    Li

FOREIGN PATENT DOCUMENTS

| EP | 3396051 | 10/2018 |
| EP | 3502865 | 6/2019 |
| JP | 2004173729 | 6/2004 |
| KR | 1020070067386 | 6/2007 |
| KR | 1020090017826 | 2/2009 |
| KR | 1020140095779 | 8/2014 |
| KR | 1020170122774 | 11/2017 |

OTHER PUBLICATIONS

European Patent Office Application Serial No. 19211999.8, Search Report dated May 19, 2020, 11 pages.
Jurafsky, D. et al., "Chapter 6—Vector Semantics", Speech and Language Processing, Dec. 2018, XP055690347, 33 pages.
European Patent Office Application Serial No. 19211999.8, Office Action dated Oct. 28, 2021, 8 pages.

LAUNDRY SCHEDULING DEVICE

CROSS-REFERENCE TO RELATED APPLICATIONS

This application is a continuation of International Application No. PCT/KR2018/015955, filed on Dec. 14, 2018, the contents of which are all incorporated by reference herein its entirety.

BACKGROUND

Field of the Invention

The present invention relates to a laundry scheduling device for extracting various features of each of a plurality of laundry items from a user's utterance and scheduling the laundry of the plurality of laundry items according to the acquired features.

Discussion of the Related Art

Artificial intelligence is a field of computer engineering and information technology that studies a method for enabling computers to do thinking, learning, and self-development that can be done by human intelligence, and allows the computers to imitate human intelligence.

In addition, artificial intelligence does not exist in its own right, but has many direct and indirect links with other areas of computer science. Especially, it has been actively attempted to introduce an artificial intelligence element to many fields of information technology to utilize it to solve problems in the fields.

In addition, techniques for perceiving and learning the surrounding situation using artificial intelligence, providing information desired by the user in a desired form, or performing a desired operation or function are being actively studied.

On the other hand, the features of laundry items vary widely, and the washing method may vary depending on the features of the laundry items.

For example, since cloth of underwear is easy to be damaged, a washing method is required to minimize it. In the case of a shirt, a washing method is required to minimize the occurrence of wrinkling, and in the case of white clothes, a washing method is required to wash white clothes in a state of not being mixed with clothes of different colors.

However, it is not easy for the washing apparatus to grasp the various features of the laundry items.

Specifically, a sensing capability may have limitations in detecting the features of the laundry items by sensors, and the cost due to the installation of the sensors is increased.

Also, the features of the laundry items may be grasped through a user's button input or text input. However, when the user is requested to input a very wide variety of features, there is high possibility that the user does not use such a function.

On the other hand, speech recognition technology has been developed recently, and a method of identifying the features of the laundry items using the user's utterance may be considered.

However, the representation of the same laundry item may vary widely. Therefore, it is required to extract information necessary for grasping the features of a laundry item from these various expressions.

In addition, when the features of various types of laundry items are grasped, it is required to appropriately schedule laundry such that the optimum washing is performed using the detected features.

In recent years, various washing f apparatuses capable of performing washing functions such as washing apparatuses, stylers, and dryers have been developed. Accordingly, when the features of various types of laundry items are grasped, it is required to appropriately schedule the laundry in various washing apparatuses such that the optimum laundry is performed.

SUMMARY

The present invention has been made to solve the above problems and it is an object of the present invention to provide a laundry scheduling device for extracting various features of a plurality of laundry items from a user's utterance, and scheduling laundry of the plurality of laundry items according to the acquired features.

A laundry scheduling device according to an embodiment of the present invention includes an input interface that receives speech including a plurality of words respectively representing a plurality of laundry items from a use, and a processor that acquires one or more features represented by each of the plurality of words by inputting speech data corresponding to the received speech to a learning model and performing word embedding, and generates a laundry schedule of the plurality of laundry items based on the one or more features represented by each of the plurality of words.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE PREFERRED EMBODIMENTS

Figure 1:
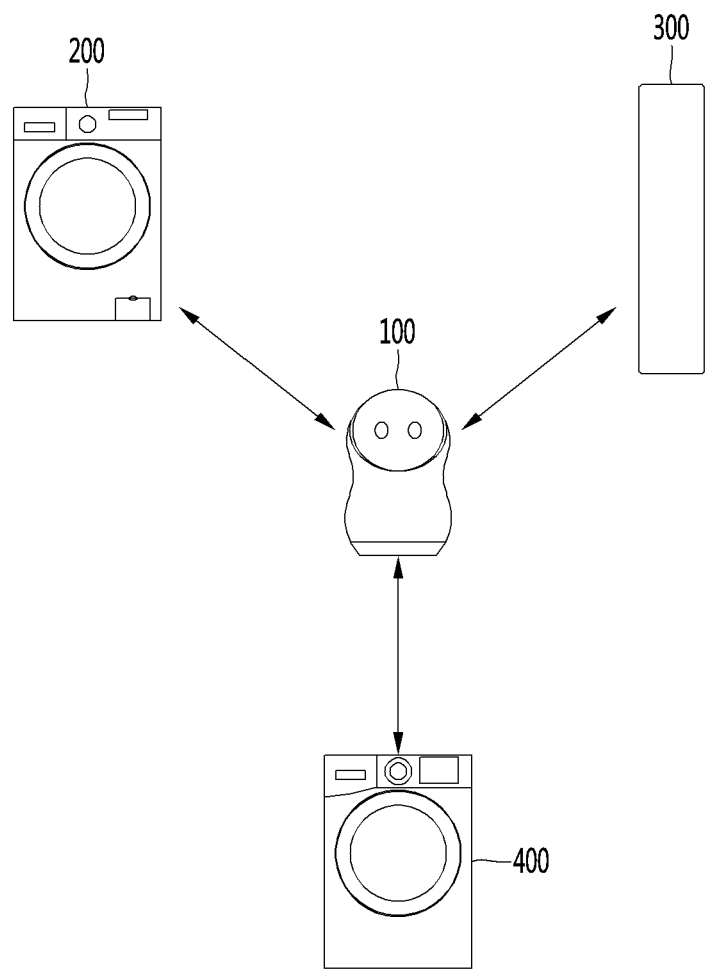
FIG. 1 is a diagram for describing a laundry scheduling system according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

First, artificial intelligence (AI) is described below in brief.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network". The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

These parameters are internal parameters and may be determined or updated through training of an Artificial Neural Network (ANN).

Another examples of the artificial neural network (ANN) parameter are an activation function that takes a sum of the number of layers, the number of neurons, the connection pattern between neurons of different layers, the weighting of an input received from the previous layer and generates an output value. These parameters are external parameters and may be set by a user.

An ANN trained based on training data may classify or cluster input data, based on a pattern of the input data.

In this specification, an ANN trained based on training data may be also referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data. Examples of the unsupervised learning may include clustering and independent component analysis.

Examples of an ANN using the unsupervised learning may include a generative adversarial network (GAN) and an autoencoder (AE).

The GAN is a method of improving performance through competition between two different AIs called a generator and a discriminator. In this case, the generator is a model for creating new data and generates new data, based on original data.

Moreover, the discriminator is a model for recognizing a pattern of data and determines whether inputted data is original data or fake data generated from the generator. Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator. The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data. The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To explain the Markov Decision Process (MDP), first, environment in which information necessary for the agent to perform the following actions is configured is given, second, how the agent behaves in the environment is defined, third, which action the agent performs well or badly to give a reward or penalty is determined, and fourth, experience is repeatedly taken until the future compensation reaches its peak, thus deriving the optimal policy is derived.

FIG. 1 is a diagram for describing a laundry scheduling system according to an embodiment of the present invention.

A laundry scheduling system according to an embodiment of the present invention may include a laundry scheduling device 100 and one or more washing apparatuses 200, 300 and 400.

The washing apparatus may mean a laundry processing apparatus having a function of managing laundry items such as water washing, dry cleaning, ironing, dust removal, drying, and sterilization.

A plurality of washing apparatuses may be classified into various types according to a driving method and a function. For example, the washing apparatus may include at least one of a washing apparatus, a clothes manager (a TROM styler, an air dresser, a clothes cleaner, etc.) and a dryer.

The washing apparatus may be classified into a drum washing apparatus and a top loading washing apparatus according to its operation method, and may be classified into a large washing apparatus, a general washing apparatus and a mini washing apparatus according to its size/capacity.

The dryer may be classified into a gas-type dryer and an electric dryer according to its operation method, and may mean a device for drying laundry items.

Unlike a conventional washing apparatus, a clothes manager refers to a device for providing at least one function among the functions of dry-cleaning clothes, removing dust, and sterilizing or ironing by using steam, instead of washing clothes with water.

In the present specification, articles including clothes, comforters, and washable cloths or fabrics such as dolls are collectively referred to as a laundry item.

The laundry scheduling device 100 may communicate with one or more washing apparatuses 200, 300 and 400.

The laundry scheduling device 100 may be implemented as a TV, a projector, a smartphone, a tablet, a set top box (STB), a DMB receiver, a radio, a washing apparatus, a refrigerator, a fixed robot, a movable robot, or the like. That is, the laundry scheduling device 100 may be implemented in the form of various home appliances used in the home.

Meanwhile, the laundry scheduling device 100 may be formed integrally with any one of the one or more washing apparatuses 200, 300, and 400.

The laundry scheduling device 100 may be controlled based on a user's speech.

The speech of the user may be converted into speech data through the laundry scheduling device 100.

The laundry scheduling device 100 may analyze the speech data directly or through a server (not illustrated) communicating with the laundry scheduling device 100 to obtain semantic information corresponding to the speech data.

Figure 2A:
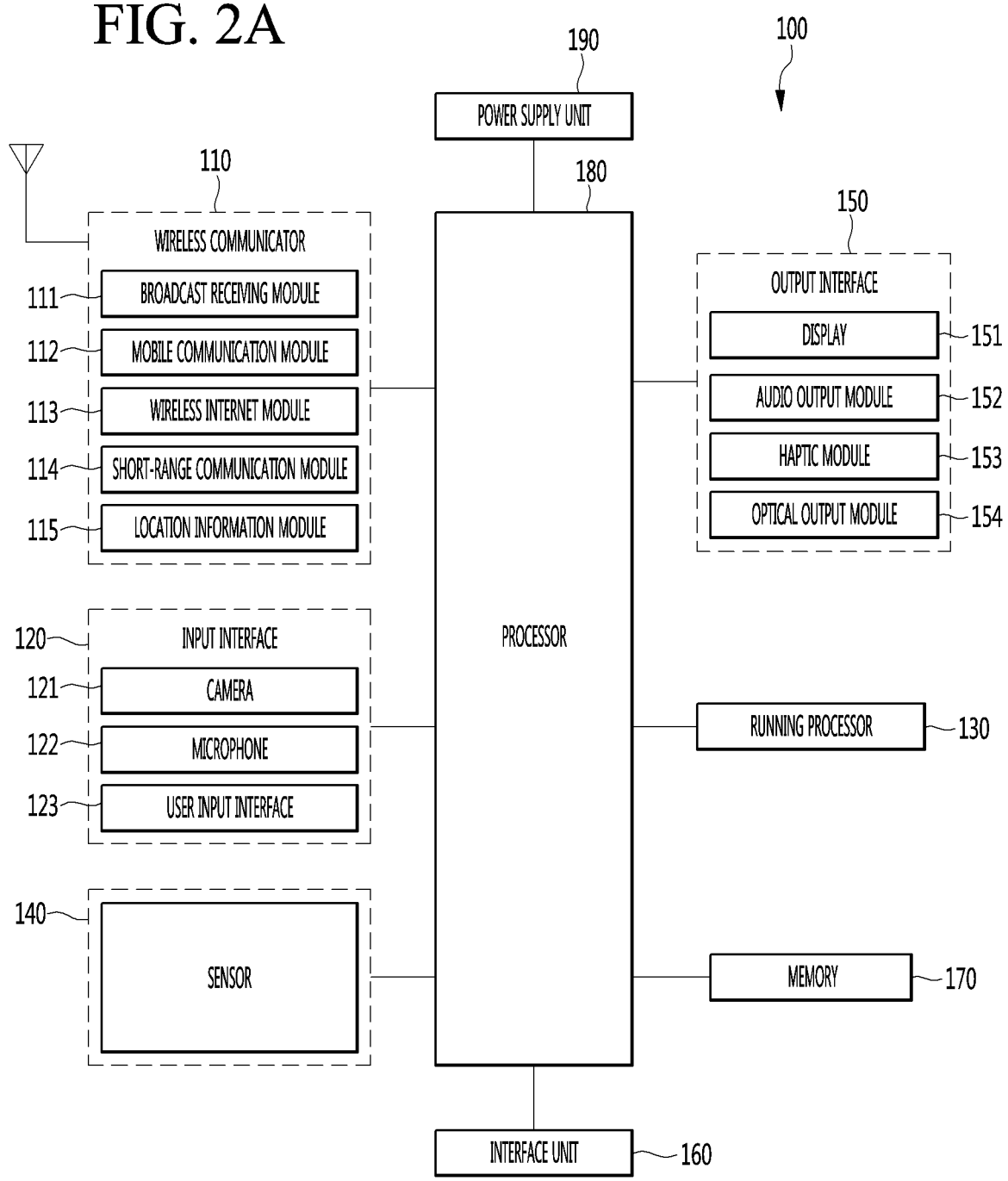
FIG. 2A is a block diagram for describing a laundry scheduling device according to an embodiment of the present invention.

FIG. 2A is a block diagram for describing a laundry scheduling device according to an embodiment of the present invention.

In the present specification, a "terminal 100" may refer to the "laundry scheduling device 100".

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Also, the terminal 100 according to an embodiment of the present invention may be applied to a fixed or movable robot.

In addition, the terminal 100 according to an embodiment of the present invention may perform the function of a speech agent. The speech agent may be a program for recognizing a user's speech and outputting a response suitable for the recognized user's speech through speech.

The terminal 100 may include a wireless communication unit 110, an input interface 120, a running processor 130, a sensor 140, an output interface 150, an interface unit 160, a memory 170, a processor 180, and a power supply unit 190.

The wireless communicator 110 typically includes one or more modules which permit communications such as wireless communications between the terminal 100 and a wireless communication system, communications between the terminal 100 and another mobile terminal, communications between the terminal 100 and an external server. Further, the wireless communicator 110 typically includes one or more modules which connect the terminal 100 to one or more networks. To facilitate such communications, the wireless communicator 110 includes one or more of a broadcast receiving module 111, a mobile communication module 112, a wireless Internet module 113, a short-range communication module 114, and a location information module 115. Regarding the wireless communicator 110, the broadcast receiving module 111 is typically configured to receive a broadcast signal and/or broadcast associated information from an external broadcast managing entity via a broadcast channel. The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. The input interface 120 may include a camera 121 for input of a video signal, a microphone 122 for receiving an audio signal, and a user input interface 123 for receiving information from a user.

The speech data or image data collected by the input interface 120 may be analyzed and processed as a user's control command.

The input interface 120 may be configured to permit various types of input to the terminal. Examples of such input include audio, image, video, data, and user input. Image and video input is often obtained using one or more cameras 121. cameras 121 may process image frames of still pictures or video obtained by image sensors in a video or image capture mode. The processed image frames can be displayed on the display 151 or stored in memory 170. The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input interface 123 is a component that permits input by a user. Such user input may enable the processor 180 to control operation of the terminal 100. The user input interface 123 may include one or more of a mechanical input element (for example, a key, a button located on a front and/or rear surface or a side surface of the terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen.

The learning processor 130 may be configured to receive, classify, store, and output information to be used for data mining, data analysis, intelligent decision making, and machine learning algorithms and techniques.

The running processor 130 may include one or more memory units configured to store data which is received, detected, sensed, generated, predefined by the terminal, or output in a different manner or which is received, detected, sensed, generated, predefined or output by another component, device, terminal or a device communicating with the terminal in a different manner.

The running processor 130 may include a memory integrated or implemented in the terminal. In some embodiments, the running processor 130 may be implemented using the memory 170.

Alternatively or additionally, the running processor 130 may be implemented using a memory associated with the terminal, such as an external memory connected directly to the terminal or a memory maintained in a server in communication with the terminal.

In other embodiments, the running processor 130 may be implemented using a memory maintained in a cloud computing environment or other remote memory locations accessible by the terminal via a communication scheme such as a network.

The running processor 130 may be configured to store data in one or more databases 130 so as to identify, index, categorize, manipulate, store, retrieve, and output data for use in supervised or unsupervised learning, data mining, predictive analysis or other machines generally.

The information stored in the running processor 130 may be utilized by the processor 180 or one or more other controllers of the terminal using any of a variety of different types of data analysis algorithms and machine learning algorithms.

Examples of such algorithms include k-nearest neighbor systems, fuzzy logic (e.g. Probability Theory), Neural Network, Boltzmann Machine, Vector Quantization, Pulse Neural Network, Support Vector Machine, Maximum Margin Classifier, Hill Climbing, Induction Logic System Bayesian Network, Peritnet (e.g., finite state machine, a millimachine, a Moore finite state machine), a classifier tree (e.g., Perceptron Tree, Support Vector Tree, Markov Tree, Decision Trees Forest, Random Forest) Potting Model and System, Artificial Fusion, Sensor Fusion, Image Fusion, Reinforcement Learning, Augmented Reality, Pattern Recognition, Automated Plan and the like.

The processor 180 may determine or predict at least one executable operation of the terminal based on information determined or generated using data analysis and machine learning algorithms. To this end, the processor 180 may request, retrieve, receive, or utilize the data of the running processor 130 and may perform control such that the terminal performs an operation predicted or determined to be desirable, among the at least one executable operation.

The processor 180 may perform various functions to implement intelligent emulation (i.e., a knowledge based system, an inference system, and a knowledge acquisition system). This may be applied to various types of systems (e.g., fuzzy logic systems), including adaptive systems, machine learning systems, artificial neural networks, and the like.

The processor 180 may also include sub-modules for enabling computations involving speech and natural language speech processing such as an I/O processing module, an environmental condition module, a speech-text (STT) processing module, a natural language processing module, a workflow processing module, a service processing module.

Each of these sub-modules may have access to one or more systems or data and models or a subset or superset thereof in the terminal. In addition, each of the sub-modules may provide various functions, including a vocabulary index, user data, a workflow model, a service model, and an automatic speech recognition (ASR) system.

In another embodiment, the processor 180 or another aspect of the terminal may be implemented with the sub-modules, systems, or data, and models.

In some examples, based on the data of the running processor 130, the processor 180 may be configured to detect and sense requirements based on a context condition or the user's intention which is represented by a user input or a natural language input.

The processor 180 may actively derive and obtain information necessary to fully determine the requirements based on the context condition or the user's intention. For example, the processor 180 may actively derive the necessary information to determine requirements by analyzing historical data including historical inputs and outputs, pattern matching, unambiguous words, input intentions, and the like The processor 180 may determine a task flow for executing a function for responding to a requirement based on the context condition or the user's intention.

The processor 180 may collect, sense, extract, and detect and/or receive signals or data used for data analysis and machine learning operations through one or more sensing components in the terminal, in order to collect information for processing and storage in the running processor 130.

Information collection may include sensing information through a sensor, extracting information stored in the memory 170, or receiving information from another terminal, an entity, or an external storage device through communication means.

The processor 180 may collect and store usage history information from the terminal.

The processor 180 may determine the optimal matching to perform a particular function using the stored usage history information and predictive modeling The processor 180 may receive or sense surrounding environment information or other information through the sensor 140.

The processor 180 may receive broadcast signals and/or broadcast-related information, wireless signals, and wireless data through the wireless communicator 110.

The processor 180 may receive image information (or a corresponding signal), audio information (or a corresponding signal), data, or user input information from the input interface 120.

The processor 180 may collect information in real time, process or classify the information (e.g., knowledge graphs, command policies, personalization databases, dialog engines, etc.) and store the processed information in the memory 170 or the running processor 130.

When the operation of the terminal is determined based on data analysis and machine learning algorithms and techniques, the processor 180 may control the components of the terminal to perform the determined operation. The processor 180 may control the terminal according to the control command and then perform the determined operation.

The processor 180 may analyze historical information indicating the performance of a particular operation through data analysis and machine learning algorithms and techniques when the particular operation is performed, and perform update of previously learned information based on the analyzed information.

Thus, the processor 180 may improve the accuracy of future performance of data analysis and machine learning algorithms and techniques based on the updated information in cooperation with the running processor 130.

The sensor 140 is typically implemented using one or more sensors configured to sense internal information of the mobile terminal, the surrounding environment of the mobile terminal, user information, and the like. For example, in FIG. 1A, the sensor 140 is shown having a proximity sensor 141 and an illumination sensor 142.

If desired, the sensor 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensor 140, and in particular, information obtained from one or more sensors of the sensor 140, and combinations thereof.

The output interface 150 is typically configured to output various types of information, such as audio, video, tactile output, and the like. The output interface 150 is shown having a display 151, an audio output module 152, a haptic module 153, and an optical output module 154.

The display 151 displays (outputs) information processed by the terminal 100. For example, the display 151 may display execution screen information of an application program driven in the terminal 100, or UI (User Interface) and GUI (Graphic User Interface) information according to the execution screen information.

The display 151 may have an inter-layered structure or an integrated structure with a touch sensor in order to facilitate a touch screen. The touch screen may provide an output interface between the terminal 100 and a user, as well as function as the user input interface 123 which provides an input interface between the terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like. A haptic module 153 can be configured to generate various tactile effects that a user feels, perceive, or otherwise experience. A typical example of a tactile effect generated by the haptic module 153 is vibration. An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example. The interface unit 160 serves as an interface for various external devices to be connected with the mobile terminal 100. The interface unit 160 may include wired or wireless headset ports, external power supply ports, wired or wireless data ports, memory card ports, ports for connecting a device having an identification module, audio input/output (I/O) ports, video I/O ports, earphone ports, or the like. The terminal 100 may perform appropriate control related to a connected external device in response to the connection of the external device to the interface unit 160.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

The memory 170 stores data supporting various functions of the terminal 100.

The memory 170 may store a plurality of application programs or applications that are run on the terminal 100, data and instructions for operation of the terminal 100, and data and instructions for operation of the running processor 130 (e.g., at least one algorithm information for machine learning).

The processor 180 typically functions to control overall operation of the mobile terminal 100, in addition to the operations associated with the application programs. The processor 180 may provide or process information or functions appropriate for a user by processing signals, data, information and the like, which are input or output by the various components depicted in FIG. 2A, or activating application programs stored in the memory 170. As one example, the processor 180 controls some or all of the components illustrated in FIG. 2A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

The controller 180 may typically control the general operations of the mobile terminal 100. For example, the controller 180 may set or release a lock state for restricting a user from inputting a control command with respect to applications when a status of the mobile terminal meets a preset condition.

Figure 2B:
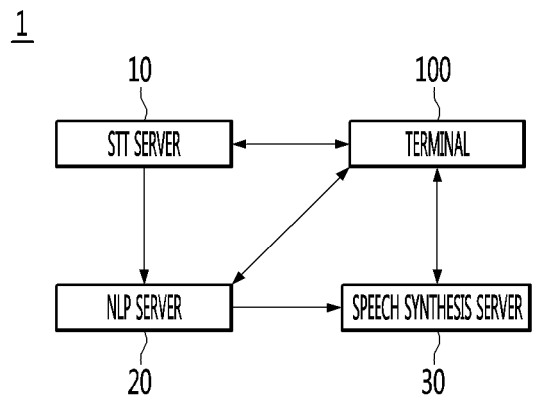
FIG. 2B is a diagram for describing a speech system according to an embodiment of the present invention.

FIG. 2B is a diagram for describing a speech system according to an embodiment of the present invention.

Referring to FIG. 2B, the speech system 1 may include a terminal 100, a Speech To Text (STT) server 10, a Natural Language Processing (NLP) server 20, and a speech synthesis server 30.

The terminal 100 may transmit speech data to the STT server 10.

The STT server 10 may convert the speech data received from the terminal 100 into text data.

The STT server 10 may improve the accuracy of speech-to-text conversion by using a language model.

The language model may refer to a model capable of calculating a probability of a sentence or calculating a probability that a next word will come when preceding words are given.

For example, the language model may include probabilistic language models such as a Unigram model, a Bigram model, an N-gram model, and the like.

The unigram model, which is a model assuming that usages of all words are completely independent of each other, is a model that calculates a probability of a word sequence by the product of probabilities of words.

The Biagram model is a model assuming that the usage of a word depends only on a single preceding word.

The N-gram model is a model assuming that the usage of a word depends on (n−1) preceding words.

That is, the STT server 10 may determine whether the text data converted from the speech data is suitably converted using the language model, thereby improving the accuracy of conversion into text data.

The NLP server 20 may receive text data from the STT server 10. The NLP server 20 may perform intent analysis on the text data based on the received text data.

The NLP server 20 may transmit intent analysis information indicating a result obtained by performing the intent analysis to the terminal 100.

The NLP server 20 may generate the intent analysis information by sequentially performing a morpheme analysis step, a syntax analysis step, a speech act analysis step, and a dialog processing step on the text data.

The morpheme analysis step is a step of dividing the text data corresponding to speech uttered by the user into morpheme units, which are the smallest units having meaning, and determining which part of speech each of morphemes has.

The syntax analysis step is a step of classifying the text data into a noun phrase, a verb phrase, an adjective phrase, etc. using a result of the morpheme analysis step, and determining a relation between the phrases.

Through the syntax analysis step, the subject, object, and modifiers of the speech uttered by the user may be determined.

The speech act analysis step is a step of analyzing intent of the speech uttered by the user using a result of the syntax analysis step. Specifically, the speech act analysis step is a step of determining intent of a sentence such as whether a user is asking a question, making a request, or simply expressing an emotion.

The dialog processing step is a step of determining whether to answer the user's utterance, to respond to the utterance, or to ask a question inquiring additional information, using a result of the speech act analysis step.

After the dialog processing step, the NLP server 20 may generate the intent analysis information including at least one of an answer to the intent of the user's utterance, a response and an inquiry of the additional information.

Meanwhile, the NLP server 20 may receive text data from the terminal 100. For example, when the terminal 100 supports the speech-to-text conversion function, the terminal 100 may convert speech data into text data and transmit the text data to the NLP server 20.

The speech synthesis server 30 may combine the previously stored speech data to generate a synthesized speech.

The voice synthesizing server 30 may record the speech of a person selected as a model and divide the recorded speech into syllables or words. The speech synthesis server 30 may store the divided speech in internal or external database in syllable or word units.

The speech synthesis server 30 may search for syllables or words corresponding to given text data from the database and synthesize a combination of the syllables or the words searched to generate a synthesized speech.

The speech synthesis server 30 may store a plurality of speech language groups respectively corresponding to a plurality of languages.

For example, the speech synthesis server 30 may include a first speech language group recorded in Korean, and a second speech language group recorded in English.

The speech synthesis server 30 may translate text data of the first language into text of the second language and generate synthesized speech corresponding to the translated text of the second language using the second speech language group.

The speech synthesis server 30 may transmit the generated synthesized speech to the terminal 100.

The speech synthesis server 30 may receive the intent analysis information from the NLP server 20.

The speech synthesis server 30 may generate the synthesized speech reflecting the intent of the user based on the intent analysis information.

In one embodiment, the STT server 10, the NLP server 20, and the synthesis server 30 may be implemented as one server.

The above-described functions of the STT server 10, the NLP server 20 and the voice synthesis server 30 may be also performed in the terminal 100. To this end, the terminal 100 may include a plurality of processors.

Figure 3:
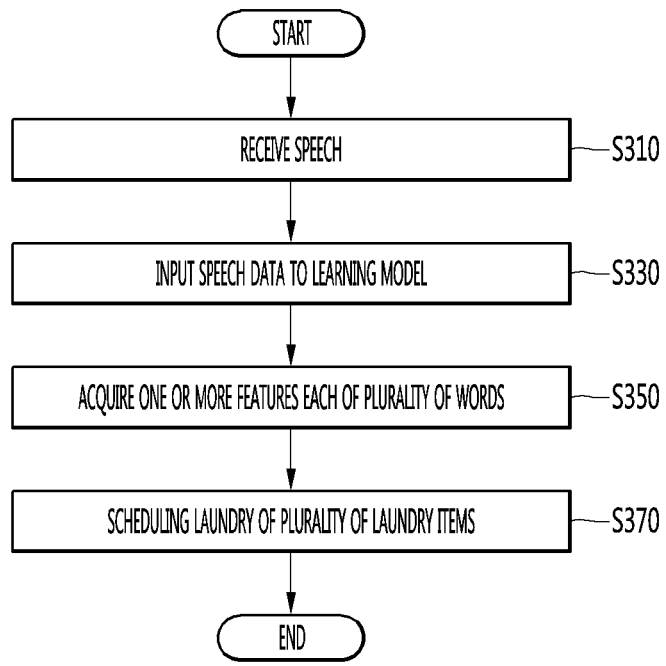
FIG. 3 is a diagram for describing a method of operating the laundry scheduling device according to the embodiment of the present invention.

FIG. 3 is a diagram for describing an operation method of a laundry scheduling device according to an embodiment of the present invention.

Referring to FIG. 3, an operation method of a laundry scheduling device according to an embodiment of the present invention may include a step of receiving speech including a plurality of words respectively representing a plurality of laundry items (S310), performing word embedding by inputting speech data corresponding to the received speech to a trained model (S330), and a step of scheduling laundry of the plurality of laundry items based on one or more features represented by the plurality of words.

Before describing the above steps, the features necessary for scheduling laundry will be described with reference to FIG. 4, and a method of training a trained model will be described with reference to FIG. 5.

Figure 4:
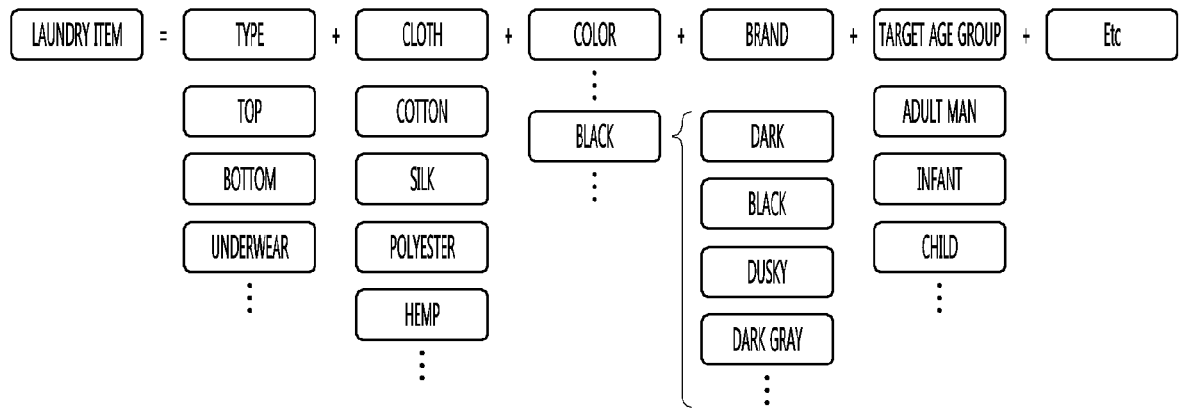
FIG. 4 is a diagram showing features required for scheduling laundry.

FIG. 4 is a diagram showing features necessary for scheduling laundry.

Here, the features necessary for scheduling laundry may mean features which the laundry scheduling device recognizes among many features which a laundry item may have, and reflects the same in the scheduling of the laundry.

Specifically, there are various features necessary for scheduling laundry. In this case, the features necessary for scheduling laundry may be classified according to various criteria.

For example, the features necessary for scheduling laundry may be classified into types, cloth, colors, brands, target age groups, and the like of laundry items.

The types of a laundry item may include a top, a bottom, underwear, a jumper, a coat, and the like.

The cloth may include materials such as cotton, silk, polyester, hemp, and the like.

The colors may also include black, white, blue, red, and the like.

The target age groups may include an adult man, an infant, a child, an elderly person, an adult woman, and the like.

Meanwhile, one feature necessary for scheduling laundry may be variously called. For example, the feature "black" may be actually called "dark", "black", "dusky" or "dark gray" by a user.

Therefore, it is necessary to classify the various expressions related to laundry as features that should be recognized by a washing apparatus.

Figure 5:
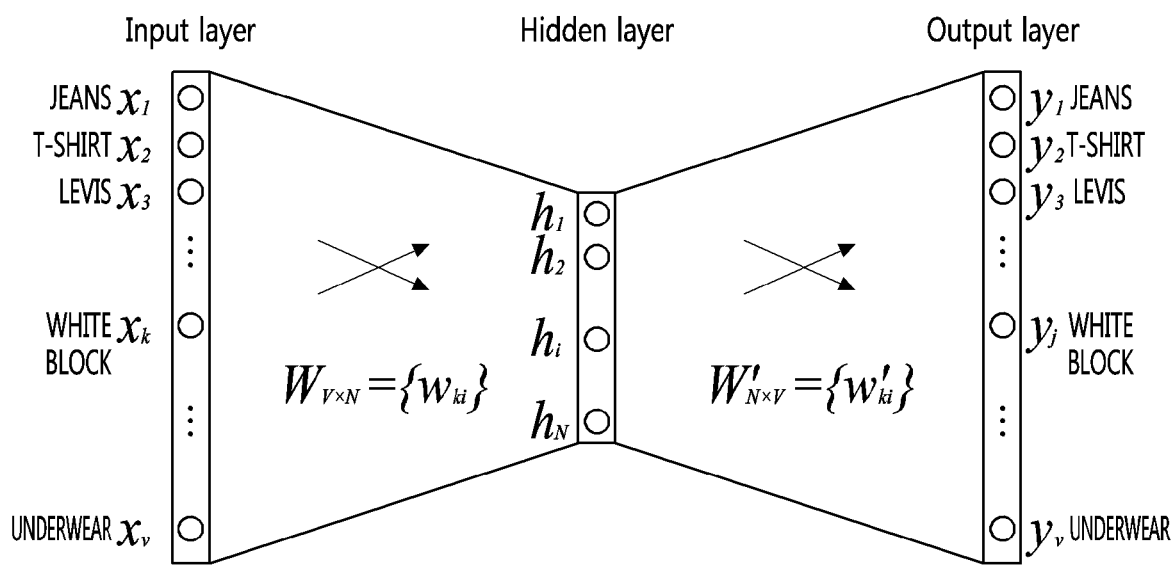
FIG. 5 is a diagram for describing a method of training a learning model installed in a laundry scheduling device.

FIG. 5 is a diagram for explaining a training method of a learning model installed in the laundry scheduling device.

Word embedding refers to a technique of digitizing a word and representing it on a vector space.

The neural network may be learned to perform word embedding on the received speech data.

Specifically, the neural network may be provided with speech data including a large number of expressions representing laundry items as training data.

For example, there may be a variety of expressions such as T-shirts pronounced in various dialects, T-shirts pronounced with various intonations, tees, tisshats, etc., for the same laundry item of T-shirts.

As another example, there may be various expressions such as denim, jeans, Levis, etc. for the same laundry item of jeans.

For example, a large number of modifiers may be used for laundry items. There may be various expressions such as a black tea, a dark tea, a dark gray tea, a white tea, a lily-white tea, a long-sleeve tea, a short-sleeve tea.

In addition, speech data including a large number of expressions representing laundry items may be provided to the neural network as training data.

On the other hand, during training, the neural network may find patterns from the training data and update parameters of the neural network such that the training data is clustered according to the patterns.

The neural network may represent words related to laundry items as vectors through the Word2Ve method and perform embedding on the words in the vector space.

In order to perform the Word2Vec method, an auto encoder, a CBOW, a Skip-Gram, and the like may be used for the neural network.

As the learning progresses through the training data, the training data may be clustered according to the patterns because words having the same meaning or high relevance are gathered into a single cluster in the vector space.

In this case, a cluster of words having the same meaning or high relevance may represent one or more features of the laundry item.

For example, when pieces of speech data such as T-shirts pronounced in various dialects, T-shirts pronounced with various intonations, tees and tisshats are input to the trained neural network, the vectors respectively corresponding to the T-shirts, tees and tisshats may be gathered into a first cluster. The first cluster may represent the feature of a laundry item called T-shirt.

On the other hand, word embedding using the Word2Vec method is generally performed by non-mapping learning. By performing a part of the map learning together, words which are different in pronunciation or are somewhat different in the meaning, but in the scheduling of the laundry item, can be interpreted as one meaning may be gathered in a single area.

Specifically, denim, jeans, and Levis have totally different pronunciations, but should be interpreted as a single meaning (jeans) in the scheduling of laundry.

Also, the undies and girdles are different in their actual meaning and pronunciation, but may be interpreted as a single meaning (underwear) in the scheduling of laundry.

Therefore, the features necessary for the scheduling of the laundry may be labeled in the training data and inputted together with the training data in the neural network.

For example, speech data of denim, jeans, and Levis may be labeled with jeans (or a feature vector representing jeans) and inputted along with the training data. In another example, undies and girdles may be labeled with underwear and inputted along with the training data.

In this case, as the learning progresses through the training data, the words may be clustered according to features necessary for the scheduling of the laundry.

For example, vectors corresponding to denims, jeans, and Levis, respectively, may be gathered in a second cluster. In this case, the second cluster may represent features necessary for laundry scheduling of the laundry item called jeans.

In another example, vectors corresponding to undies and girdles, respectively, may be gathered in a third cluster. In this case, the third cluster may represent features necessary for laundry scheduling of the laundry item, called underwear.

On the other hand, a word may be composed of a plurality of detailed words. The above-described training process may be applied to the detailed words as it is.

Such a training process may be performed in a learning device of an artificial neural network.

The learning device of the artificial neural network may include a data input unit, a processor and a neural network.

The data input unit may receive training data or receive training data and data labeled in the training data.

The processor may allow the artificial neural network to learn by inputting a training set including the training data, or the training data and data labeled in the training data into the neural network. The parameters of the neural network may thus be determined.

The artificial neural network whose parameters are determined by being learned using the training data as described above may be referred to as a trained model in this specification.

On the other hand, a trained model may be used to infer a result value for new input data rather than the training data.

On the other hand, the trained model may be newly installed in the laundry scheduling device or replace an existing learning model in a washing apparatus.

On the other hand, the trained model may be implemented by hardware, software, or a combination of hardware and software, and when some or all of the trained model is implemented in software, one or more commands that constitute the trained model may be stored in a memory of the laundry scheduling device.

Returning to FIGS. 3, S310 and S330 will be described.

The processor may receive a speech including a plurality of words each representing a plurality of laundry items from a user through the input interface.

As used herein, a word may refer to a single laundry item. For example, "black tee" refers to a single laundry item and may be a word. In addition "black adult jeans" refers to one laundry item and may be a word. In another example, when the user utters "pants and skirts", since the "pants" and "skirts" refer to separate laundry items, the user's speech may include two words.

Meanwhile, the processor may convert the received speech to generate speech data, and input the generated speech data to the trained model.

Next, S350 will be described with reference to FIG. 6.

Figure 6:
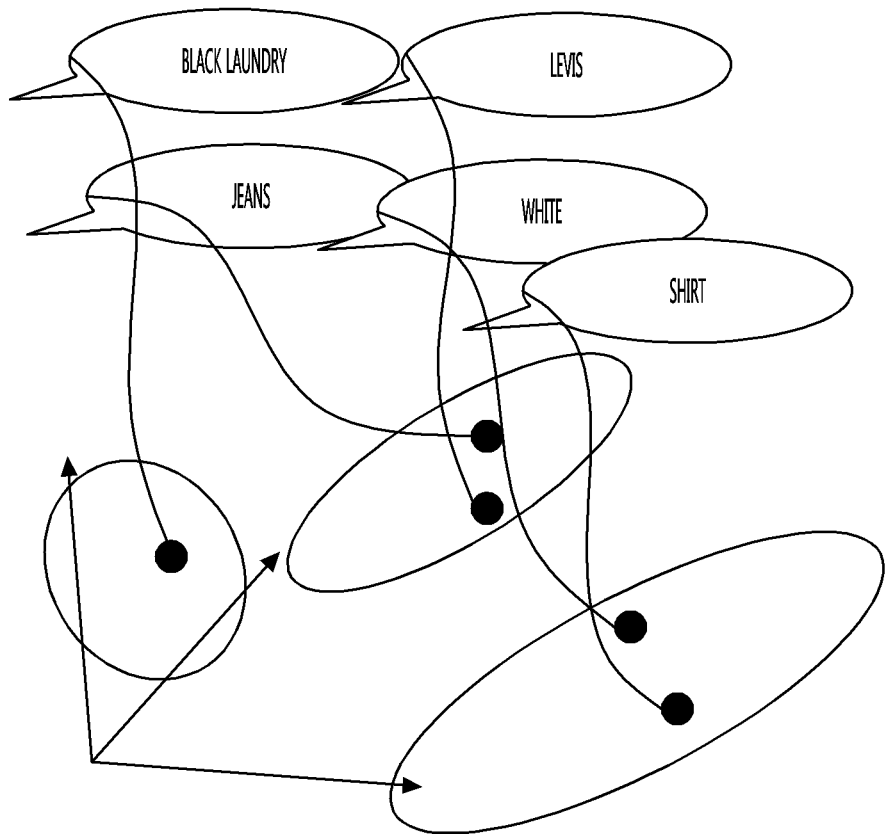
FIG. 6 is a diagram for describing a method of performing word embedding on a plurality of words included in speech according to an embodiment of the present invention.

FIG. 6 is a diagram for describing a method of performing word embedding on a plurality of words included in speech according to an embodiment of the present invention.

The processor may perform word embedding by inputting speech data corresponding to received speech to a learning model.

Specifically, the processor may input speech data corresponding to the received speech to the learning model.

In this case, the learning model may perform embedding on each of a plurality of words included in the speech data according to preset parameters. When the learning model uses the Word2Vec method, each of the plurality of words is expressed as a vector and may be embedded in the vector space as shown in FIG. 6.

That is, when the user's speech includes a first word and a second word, the learning model may cluster the first word into a first cluster and cluster the second word into a second cluster.

While each of a plurality of clusters may correspond to one or more features necessary for scheduling laundry. For example, a first cluster may correspond to jeans, a second cluster may correspond to white cloth, a third cluster may correspond to shirts, a fourth cluster may correspond to black, a fifth cluster may correspond to white, and a sixth cluster may correspond to underwear. In another example, the first cluster in which the shirt is clustered may correspond to the features of the top, cotton, white, and adult man that are features of the shirts.

Thus, the processor may acquire one or more features represented by each of the plurality of words according to results of clustering.

On the other hand, the learning model may cluster the first word representing the first laundry item and the second word representing the first laundry item into a single cluster representing the first laundry item. In this case, the processor may acquire the same feature from the first word and the second word.

For example, when the first laundry item is a T-shirt, the word "T-shirt" may represent the first laundry item, and the word "tisshats" may also represent the first laundry item. In this case, the learning model may cluster the word "T-shirt" and the word "tisshats" into the same cluster. The processor may then acquire a T-shirt that is the same feature from the word "T-shirt" and the word "tisshats".

In another example, when the second laundry item is jeans, the "jeans" with specific intonation represents the second laundry item, and the "jeans" with no intonation may also represent the second laundry item. In this case, the learning model may cluster "jeans" with specific intonation and "Jeans" with no intonation into the same cluster. The processor may acquire a jeans that is the same feature tee from the "jeans" with specific intonation and the "jeans" with no intonation.

While a word may include a plurality of sub-words, and the processor may acquire one or more features which each of the plurality of sub-words represents. For example, the processor may acquire a plurality of features represented by a first word by input the first word representing a first laundry item into a learning model.

Specifically, the processor may input speech data corresponding to the received speech to the learning model.

In this case, the learning model may perform embedding on each of a plurality of words included in the speech data according to set parameters. When the learning model uses the Word2Vec method, each of the plurality of sub-words may be expressed as a vector and embedded in the vector space as shown in FIG. 6.

That is, when the user's speech includes a first word and a second word and the first word includes a first sub-word and a second sub-word, the learning model may cluster the first sub-word into a first cluster, cluster the second sub-word into a second cluster, and cluster the second word into a third cluster.

The processor may acquire features represented by each of the plurality of sub-words according to a result obtained by clustering each of the sub-words. Therefore, the processor may acquire a plurality of features from a single word.

For example, when a word is "white pants", the "white pants" may include a first sub-word "white" and a second sub-word "pants".

In this case, the learning model may cluster the first sub-word (white) into a first cluster corresponding to a feature of white and the second sub-word (pants) into a second cluster corresponding to a feature of pants.

Accordingly, the processor can acquire the feature of white and the feature of pants from one word "white pants".

On the other hand, the processor may acquire a plurality of features represented by a single word through vector operation.

Specifically, when the learning model, having received the first word, outputs a first feature vector, the processor may perform vector operation of the first feature vector with a second feature vector related to the first feature vector to acquire a plurality of features.

Details related thereto will be described below with reference to FIG. 7.

Figure 7:
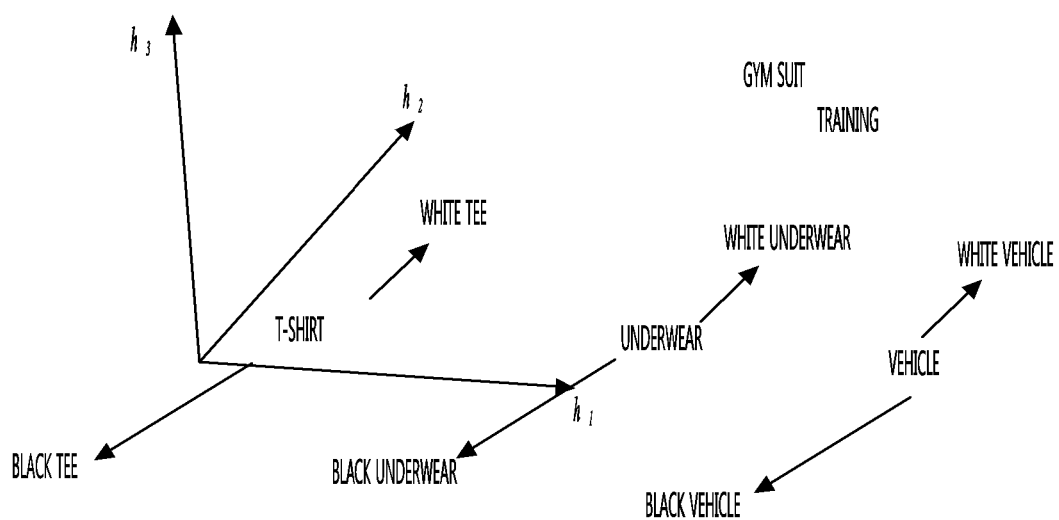
FIG. 7 illustrates a vector space according to a Word2Vec method, according to an embodiment of the present invention.

FIG. 7 illustrates a vector space according to the Word2Vec method, according to an embodiment of the present invention.

Due to the features of the word embedding and the Word2Vec method, words in similar meaning and words that may be used together may be gathered in a similar space.

For example, when a word 'eat' is located at a specific point in the vector space, words having similar relationships to the word 'eat', such as 'ate', 'will eat', 'want to eat' and the like, may be located nearby.

As another example, when the word 'eat' is located at a specific point in the vector space, words that may be used with 'eat', such as chicken, pizza, cake, and the like may be located nearby.

As described above, a relation that a word and another word are similar or may be used together and are thus gathered in a similar space in the vector space may be expressed as "a word and another word are related" or "The feature vector of a word and the characteristic vector of another word are related" in the present specification.

Referring to FIG. 6, "underwear" may be arranged in a space similar to that of "white underwear" and "black underwear" due to the features of the trained model according to the present invention.

When the trained model, which has received a first word, outputs a first feature vector, the processor performs a vector operation with a second feature vector related to the first feature vector to acquire a plurality of features represented by the first word.

Specifically, it is assumed that clustering is performed on a word-by-word basis, without using the detailed words described above. It is assumed that "black tee" is input to the trained model and a first feature vector corresponding to the "black tee" is output.

In this case, the processor may perform a vector operation between the first feature vector and the second feature vector related to the first feature vector.

For example, the first feature vector of the black tee may be related to the second feature vector of a T-shirt. In addition, when the first feature vector is [9, 7] and the second feature vector is [6, 4], the processor may calculate a third feature vector [3, 3] through vector operation. In this case, the third feature vector may be "black" which is obtained by subtracting a T-shirt from a black tee.

In this way, the processor may acquire a plurality of features represented by a single word from the single word.

Figure 8:
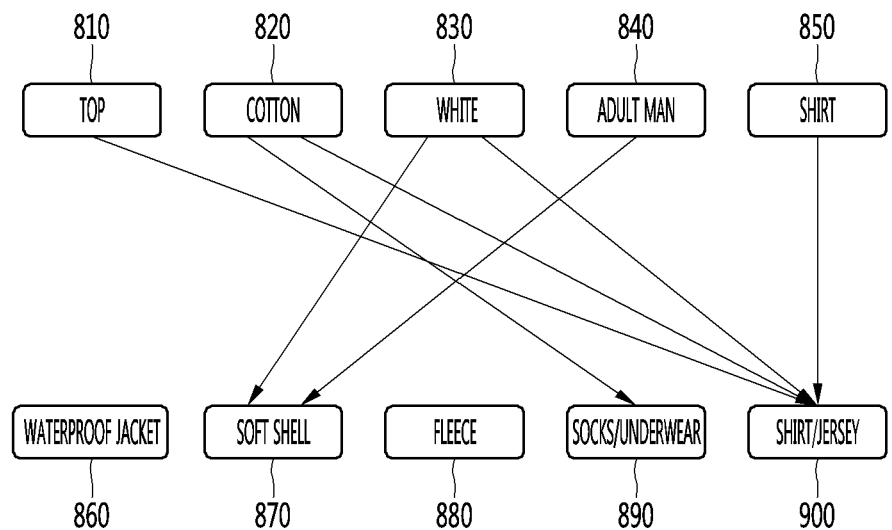
FIG. 8 is a diagram for describing a method of acquiring laundry information suitable for laundry according to an embodiment of the present invention.

FIG. 8 is a diagram for describing a method of acquiring laundry information suitable for a laundry item according to an embodiment of the present invention.

The processor may acquire laundry information of each of a plurality of laundry items by searching database using at least one feature represented by each of a plurality of words.

For example, one or more features represented by a first word "Y-shirt" may be a top 810, cotton 820, white 830, an adult man 840, and a shirt 850.

On the other hand, the laundry information may be information indicating a washing method for a laundry item For example, laundry information 860 for a waterproof jacket may include washing methods for the waterproof jacket, such as a washing apparatus, washing not greater than 30 degrees Celsius, wool/silk detergent, no bleach, need for additional rinsing, no dehydration, and no use of a dryer.

For example, the laundry information 890 for socks/underwear may include washing methods for the socks/underwear, such as a washing apparatus, washing by a standard program, washing not greater than 30 degrees Celsius, no need for additional rinsing, dehydration possible, drying possible, no need for hot-air drying because it is almost dried when dehydrated.

In this case, the processor may search all of the laundry information corresponding to the one or more features represented by the first word.

For example, the feature 810 of "top" may correspond to laundry information for shirt/jersey 900 and laundry information for socks/underwear 890.

As another example, the feature 830 of "white" may correspond to laundry information 870 for soft shell and laundry information for shirt jersey 900.

The processor may determine most frequently retrieved laundry information as the laundry information to be used for the first word (first laundry item).

In this way, laundry information to be used for the second word (second laundry item) may also be determined.

Meanwhile, a process of searching database may be performed not only in the laundry scheduling device but also in a database server.

Figure 9:
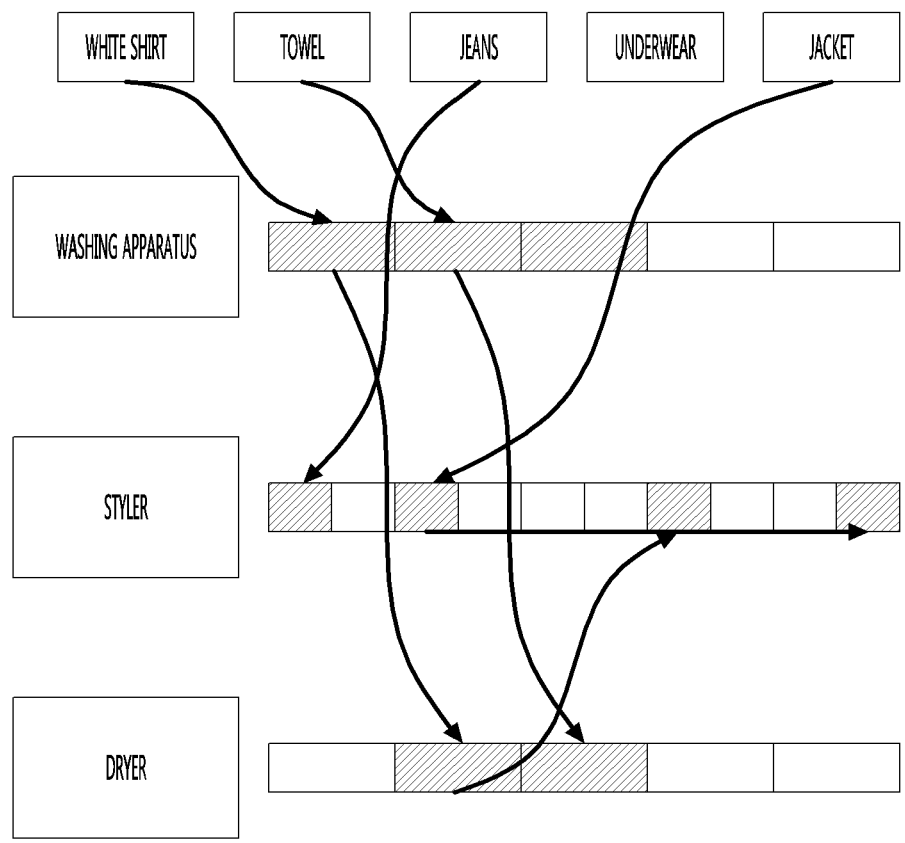
FIG. 9 is a diagram for describing a laundry scheduling method according to an embodiment of the present invention.

FIG. 9 is a diagram for describing a laundry scheduling method according to an embodiment of the present invention.

The processor may perform schedule such that a plurality of laundry items to be laundered in a single washing apparatus.

Specifically, when first laundry information corresponding to a first laundry item is obtained and second laundry information corresponding to a second laundry item is obtained, the processor may schedule the laundry of the first laundry item and the second laundry item using the first laundry information and the second laundry information.

For example, when the first laundry item is jeans and the first laundry information includes information indicating that it is not washable together with white clothes, and the second laundry item is a shirt and the second laundry information includes information indicating that it is not washable together with the dark clothes, the processor may perform scheduling such that the first laundry item and the second laundry item are separately laundered in a washing apparatus.

Hereinafter, a method of scheduling a plurality of laundry items to be divided and laundered in a plurality of washing apparatuses will be described.

The processor may classify the plurality of laundry items to be divided and laundered in a plurality of washing apparatuses based on at least one feature represented by a plurality of words.

Specifically, the processor may classify the plurality of laundry items to be divided and laundered in a plurality of washing apparatuses by using pieces of laundry information corresponding to the plurality of laundry items respectively.

For example, when the jeans should not be washed in a washing apparatus, the processor may classify the jeans to be washed in a styler instead of the washing apparatus.

For another example, when a white shirt needs to be subjected to water washing, drying, and wrinkle removal by a styler, the processor may classify the white shirt to be washed in a washing apparatus, a dryer, and a styler. In this case, the processor may designate up to the order of laundry, and perform determination such that the white shirt may be first washed in the washing apparatus, dried in the dryer, and then styled in the styler.

As another example, when a specific laundry item is to be washed in a washing apparatus and the dryer is not needed, the processor may classify the specific laundry to be laundered in the washing apparatus.

On the other hand, the processor may generate a laundry schedule of a plurality of laundry items such that the fastest laundry is performed while various conditions are satisfied.

The processor may classify a plurality of laundry items to be divided and laundered in a plurality of washing apparatuses based on the plurality of conditions and the laundry information of each of the plurality of laundry items.

The plurality of conditions may include at least one of user settings, a washing instruction, a laundry item which should not be washed together and an optimum washing apparatus for a laundry item.

Here, the user settings may mean an input of a user who perform setting to affect the scheduling of the laundry schedule. For example, when an input of "Jeans should be washed separately" or "Jeans should be washed first" is received from a user, the processor may perform scheduling in consideration of these conditions.

In addition, the washing instructions mean prohibition of hot water washing, prohibition of drying, prohibition of use of specific detergent, etc., and may be obtained from the laundry information.

Also, the laundry item which should not be washed together may mean jeans and white clothes, and an optimal washing apparatus may mean a washing apparatus most suitable for a specific laundry. The laundry item that should not be washed and the optimum washing apparatus may also be obtained from the laundry information.

Meanwhile, the processor may classify a plurality of laundry items to be divided and laundered into a plurality of washing apparatuses in consideration of the plurality of conditions, the laundry information of each of the plurality of laundry items, and the priorities of the plurality of conditions.

In this case, the priorities may be set in the laundry scheduling device by default or may be modified by a user input.

Figure 10:
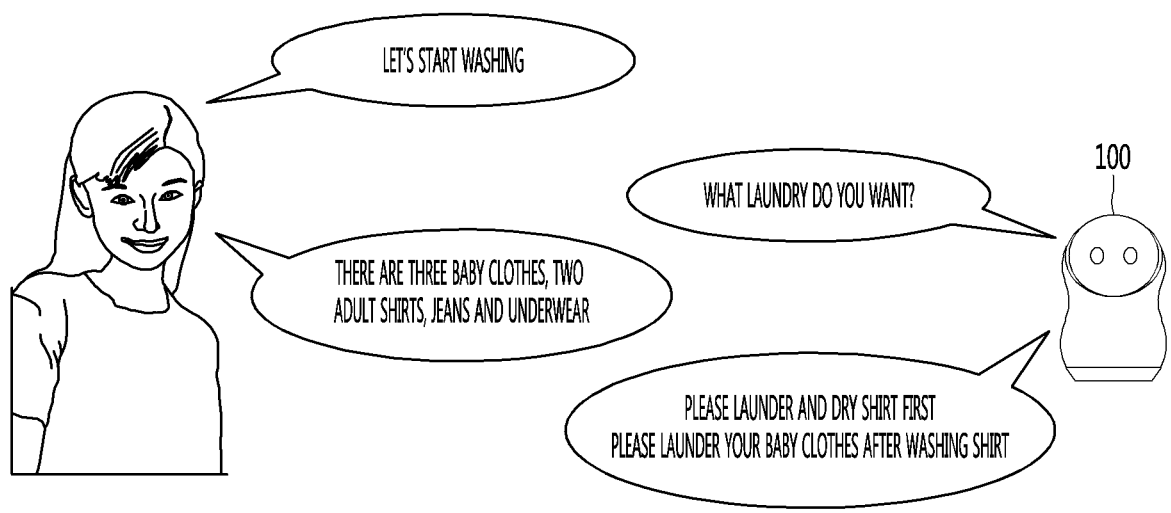
FIG. 10 is a diagram for describing a method of outputting a generated laundry schedule.

FIG. 10 is a diagram for describing a method of output a scheduled laundry schedule.

The processor may output a scheduled laundry schedule. In this case, the processor may control the display so as to visually display the laundry schedule, or may control a sound output unit so as to output speech corresponding to the laundry schedule.

Figure 11:
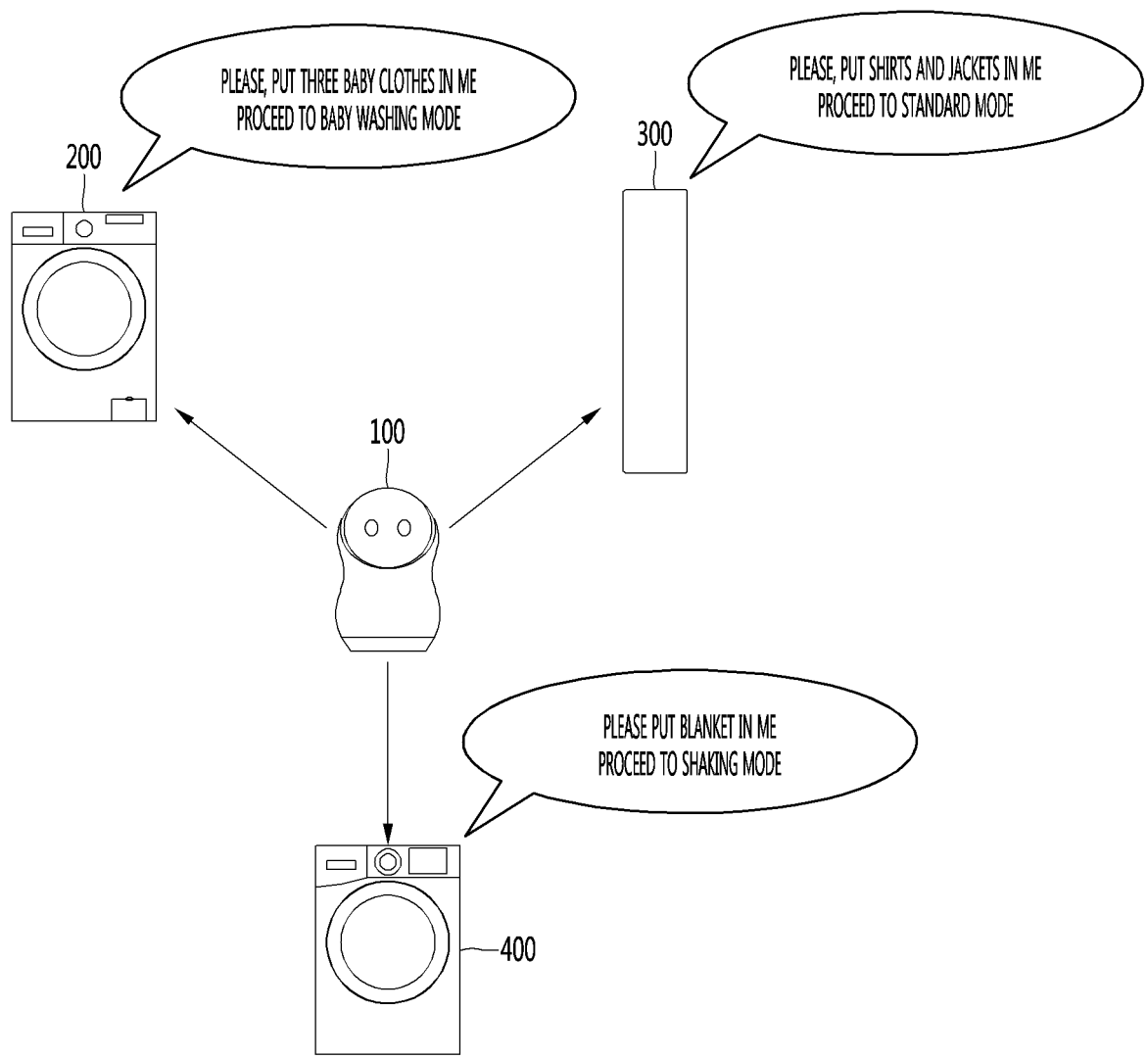
FIG. 11 is a diagram for describing a method of providing a washing service in a laundry scheduling system according to the embodiment of the present invention.

FIG. 11 is a diagram for describing a method of providing a laundry service for a laundry scheduling system according to an embodiment of the present invention.

The processor may transmit information on laundry items classified into a plurality of washing apparatuses and a laundry schedule.

Specifically, the processor may transmit information on laundry items classified into a first washing apparatus 200 and a first laundry schedule of the first washing apparatus 200 to the first washing apparatus 200 among the plurality of washing apparatuses.

In addition, the processor may transmit information on laundry items classified into a second washing apparatus and a second laundry schedule of the second washing apparatus 300 to the second washing apparatus 300 among the plurality of washing apparatuses.

On the other hand, each of the plurality of washing apparatuses may determine a washing mode based on the received laundry schedule.

Specifically, the laundry schedule may include information on washing methods such as a washing time, a washing course, a water temperature, and detergent to be used.

In this case, the first washing apparatus may set a washing mode based on the first laundry schedule.

Further, the second washing apparatus may set a washing mode based on the second laundry schedule.

On the other hand, each of the plurality of washing apparatuses may output at least one of a guidance for washing performed in the corresponding washing apparatus, that is, information on laundry items classified into the corresponding washing apparatus and a set washing mode.

For example, the first washing apparatus 200 may output speech of "Please put three baby clothes in me. Proceed to baby clothes washing mode".

On the other hand, the plurality of washing apparatuses may be equipped with a detection sensor for detecting the approach of a person. In this case, when the user's approach is detected, the plurality of washing apparatuses may output at least one of information laundry items classified into a corresponding washing apparatus and a set washing mode.

For example, when a person first moves to the first washing apparatus 200, the first washing apparatus 200 may output speech of "Please put three baby clothes in me. Proceed to a baby clothes washing mode". When the user who has puts three baby clothes into the first washing apparatus 200 moves to the second washing apparatus 300, the second washing apparatus 300 may output speech of "Please put shirts and jackets in me. Proceed to a standard washing mode".

On the other hand, a plurality of washing apparatuses may be equipped with a person recognizing device for discriminating people by using photographed images. In this case, when the same user as a user who has uttered a washing command approaches a washing apparatus, the plurality of washing apparatuses may output at least one of information on laundry items classified into the corresponding washing apparatus and a set washing mode.

Meanwhile, the plurality of washing apparatuses may set the washing mode without any additional user input for setting the washing mode in the corresponding washing apparatus, and perform the washing according to the set washing mode.

For example, the first washing apparatus has received the first laundry schedule, and the washing mode may be set without the user's separate input using the first laundry schedule.

When an explicit input from the user (speech input of "start washing") or an implicit input (input to put laundry items and close the door) is detected, the first washing apparatus may perform washing according to the determined washing mode without a user input for setting the washing mode.

Figure 12:
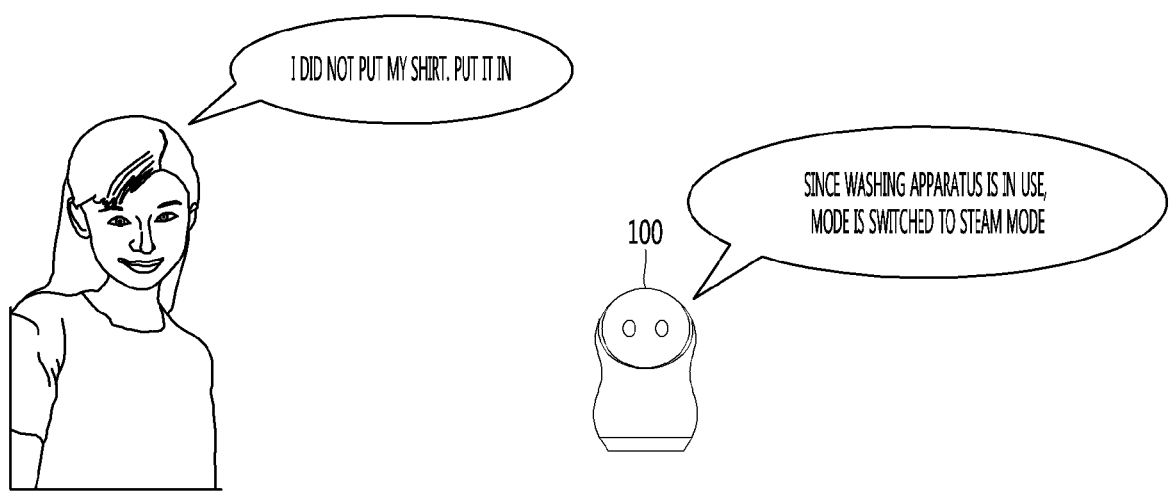
FIG. 12 is a diagram for describing an operation method when some laundry items are added, according to an embodiment of the present invention.

FIG. 12 is a diagram for describing an operation method when some laundry items are added, according to an embodiment of the present invention.

When an input for put of additional laundry items is received, the processor may select a washing apparatus in which the additional laundry items are laundered based on the operation states of the plurality of washing apparatuses.

For example, in the case where an input of "I did not put my shirt. Please put it" is received, the processor may figure out the operation states of the plurality of washing apparatuses and perform determination such that the additional laundry items are laundered in a washing apparatus other than a washing apparatus that currently operates.

In this case, the processor may again set the washing mode of the selected washing apparatus.

Specifically, based on features of the additional laundry items, the processor may generate and output a new laundry schedule reflecting the laundry information of the additional laundry items, and transmit the new laundry schedule to a selected washing apparatus.

As described above, the present invention has an advantage that it is possible to accurately acquire features necessary for the washing apparatus from various expressions representing laundry items.

In addition, the present invention has an advantage that it is possible to generate a laundry schedule such that optimal washing is performed in various washing apparatuses using recognized features.

According to the present invention, it is possible to accurately acquire features necessary in the washing apparatus from various expressions representing laundry items.

According to the present invention, it is possible to generate a washing schedule such that optimal washing is performed in various washing apparatuses using the features.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A laundry scheduling device comprising:
   an input interface configured to receive speech of a user; and
   one or more processors configured to:
      identify a plurality of terms of the received speech respectively corresponding to laundry items to be laundered;
      acquire one or more features associated with each of the plurality of terms by using a trained learning model;
      acquire laundry instructions for each of the plurality of terms based on the acquired one or more features; and
      acquire and output laundry schedule information of the laundry items,
   wherein the acquired laundry schedule information is generated based on the acquired laundry instructions.

2. The laundry scheduling device of claim 1, wherein the one or more processors are further configured to assign the laundry items to be laundered in a plurality of laundry apparatuses based on the one or more features represented by each of the plurality of terms.

3. The laundry scheduling device of claim 1, wherein the learning model clusters a first term representing a first laundry item and a second term representing the first laundry item into one cluster representing the first laundry item and acquires a same feature from the first term and the second term.

4. The laundry scheduling device of claim 1, wherein the one or more processors are further configured to obtain a plurality of features associated with a first term of the plurality of terms by inputting the first term representing a first laundry item to the learning model.

5. The laundry scheduling device of claim 4, wherein:
   the trained learning model is configured to output a first feature vector based on an input of the first term; and
   the one or more processors is further configured to obtain the one or more features associated with the first term by performing a vector operation on the first feature vector and a second feature vector related to the first feature vector.

6. The laundry scheduling device of claim 1, wherein each of the one or more features associated with each of the plurality of terms corresponds to at least a clothing type, cloth type, color, brand, or age group of a laundry item.

7. The laundry scheduling device of claim 2, wherein the one or more processors are further configured to obtain information for each of the laundry items by searching a database using the one or more features associated with each of the laundry items, wherein the laundry items are assigned to a laundry apparatus based on the obtained information for each of the laundry items.

8. The laundry scheduling device of claim 7, wherein the one or more processors are further configured to assign the laundry items to the plurality of laundry apparatuses based on at least user settings, laundry instructions for a laundry item, or an optimum laundry apparatus set for a laundry item.

9. The laundry scheduling device of claim 2, further comprising a communication unit configured to communicate with the plurality of laundry apparatuses, wherein the one or more processors are further configured to:
   transmit, to a first laundry apparatus via the communication unit, information on laundry items assigned to be laundered by the first laundry apparatus and a laundry schedule of the first laundry apparatus, and
   transmit, to a second laundry apparatus via the communication unit, information on laundry items assigned to be laundered by the second laundry apparatus and a laundry schedule of the second laundry apparatus.

10. The laundry scheduling device of claim 2, further comprising a communication unit configured to communicate with the plurality of laundry apparatuses, wherein the one or more processors are further configured to:
   receive an input for adding additional laundry items to be laundered;
   assign the additional laundry items to one or more of the plurality of laundry apparatuses based on operational statuses of the plurality of laundry apparatuses; and
   transmit a command for resetting a laundry mode of the one or more laundry apparatus.

11. A laundry scheduling system, comprising:
   a first laundry apparatus providing a first laundry function;
   a second laundry apparatus providing a second laundry function;
   a laundry scheduling device configured to:
      receive an input for scheduling laundry;
      identify a plurality of terms of the received input respectively corresponding to laundry items to be laundered;
      acquire one or more features associated with each of the plurality of terms by using a trained learning model;
      acquire laundry instructions for each of the plurality of terms based on the acquired one or more features;
      assign each of the laundry items to be laundered by the first laundry apparatus or the second laundry apparatus based on the one or more features represented by each of the plurality of terms;
      transmit a first laundry schedule to the first laundry apparatus and a second laundry schedule to the second laundry apparatus,
   wherein the first and second laundry apparatuses each sets a corresponding washing mode based on the first laundry schedule and the second laundry schedule.

12. The laundry scheduling system of claim 11, wherein the first and second washing apparatuses are configured to:
   detect a presence of a user; and
   output instruction information for laundry functions when the user is detected.

13. The laundry scheduling system of claim 11, wherein the laundry scheduling device is further configured to obtain a plurality of features associated with a first term of the plurality of terms by inputting the first term representing a first laundry item to the learning model.

14. A machine-readable non-transitory medium having stored thereon machine-executable instructions for scheduling laundry, the instructions comprising:
   receiving speech input of a user;
   identifying a plurality of terms of the received speech input respectively corresponding to laundry items to be laundered;
   acquiring one or more features associated with each of the plurality of terms by using a trained learning model;
   acquiring laundry instructions for each of the plurality of terms based on the acquired one or more features; and
   acquiring and outputting a laundry schedule information of the laundry items,
   wherein the acquired laundry schedule information is generated based on the acquired laundry instructions.

15. The machine-readable non-transitory medium of claim 14, further comprising instructions for assigning the laundry items to be laundered in a plurality of laundry apparatuses based on the one or more features represented by each of the plurality of terms.

16. The machine-readable non-transitory medium of claim 14, wherein the learning model clusters a first term representing a first laundry item and a second term representing the first laundry item into one cluster representing the first laundry item and acquires a same feature from the first term and the second term.

17. The machine-readable non-transitory medium of claim 14, further comprising instructions for obtaining a plurality of features associated with a first term of the plurality of terms by inputting the first term representing a first laundry item to the learning model.

18. The machine-readable non-transitory medium of claim 17, wherein:
   the trained learning model is configured to output a first feature vector based on an input of the first term; and
   the machine-readable non-transitory medium further comprises instructions for obtaining the plurality of features associated with the first term by performing a vector operation on the first feature vector and a second feature vector related to the first feature vector.

19. The machine-readable non-transitory medium of claim 14, further comprising instructions for:
   transmitting, to a first laundry apparatus, information on laundry items assigned to be laundered by the first laundry apparatus and a laundry schedule of the first laundry apparatus, and
   transmitting, to a second laundry apparatus, information on laundry items assigned to be laundered by the second laundry apparatus and a laundry schedule of the second laundry apparatus.

* * * * *